UNITED STATES PATENT OFFICE.

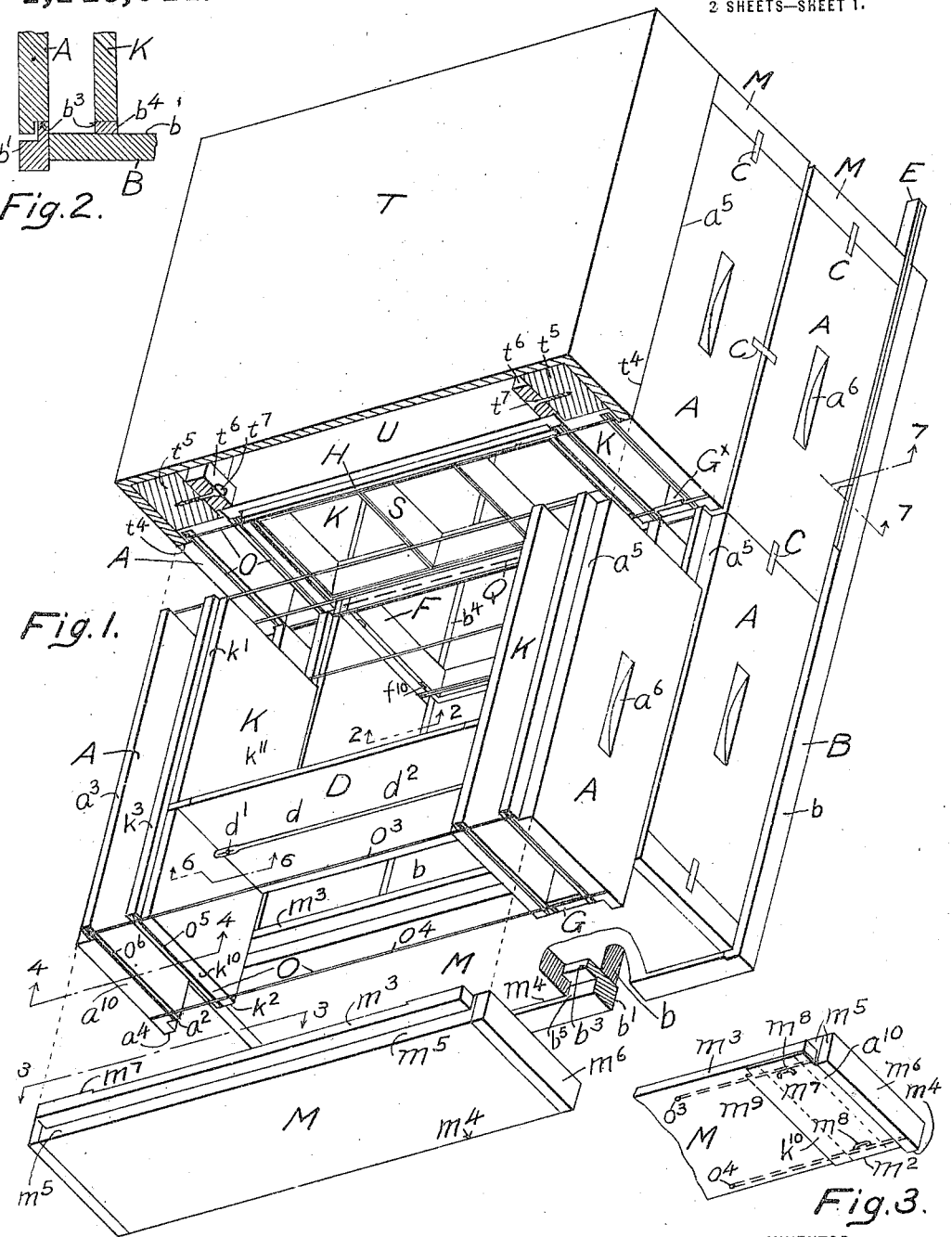

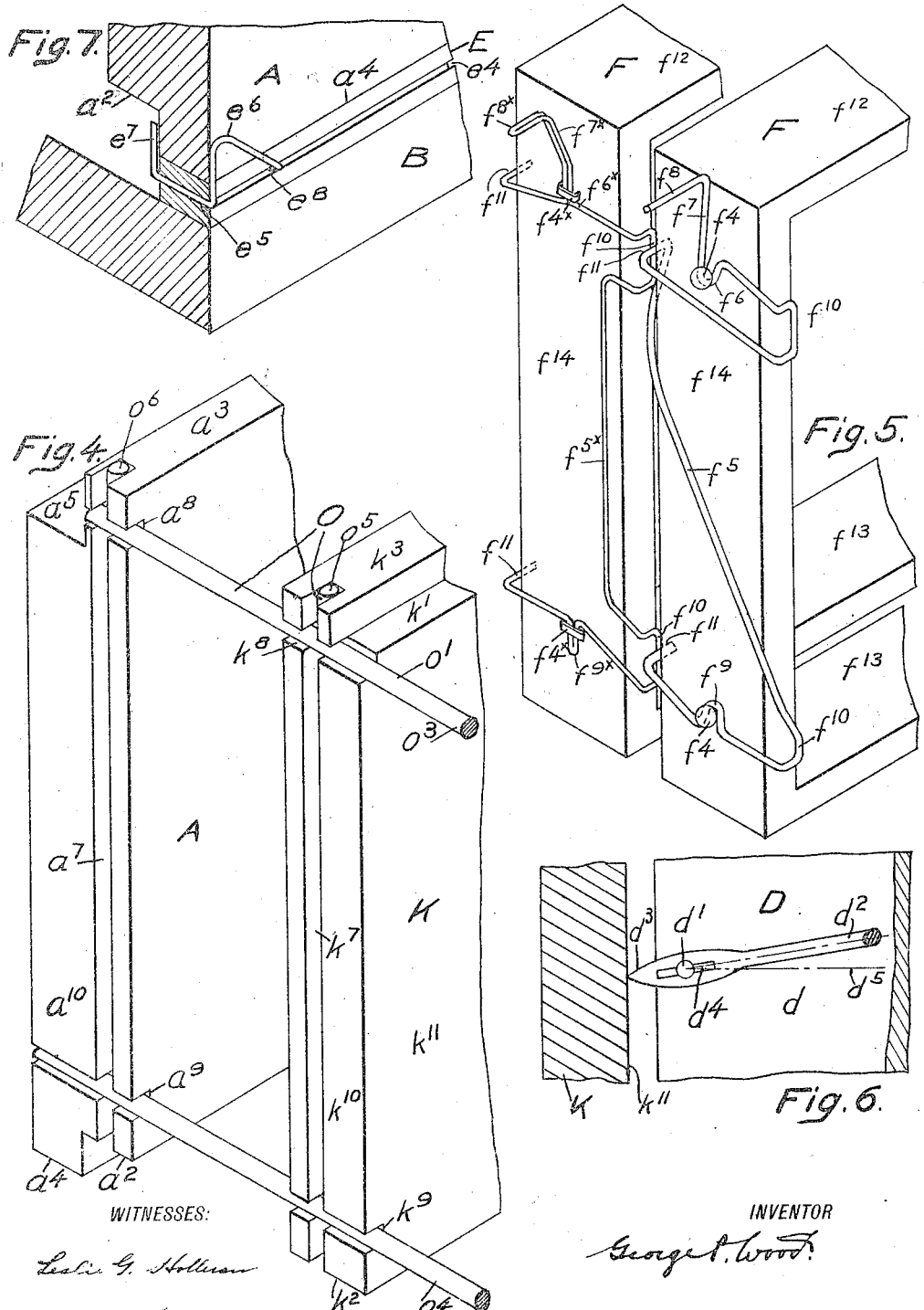

GEORGE P. WOOD, OF PEEKSKILL, NEW YORK.

BEEHIVE.

1,146,044.     Specification of Letters Patent.     Patented July 13, 1915.

Application filed April 11, 1914. Serial No. 831,210.

*To all whom it may concern:*

Be it known that I, GEORGE P. WOOD, a citizen of the United States, residing at No. 217 Walnut street, in the village of Peekskill, county of Westchester, and State of New York, have invented new and useful Improvements in Beehives, of which the following is a specification.

My invention relates to certain improvements in the construction of movable-frame sectional beehives of the general type shown and described in my Patent, No. 1,068,196, granted July 22, 1913, and contains provisions especially adapting it for use in cold climates.

It has for its principal object the manufacture and use of rectangular movable-frame hive sections, which have two opposite double walls, each containing an air space between the component parts thereof, and two opposite sides at right angles to the double walls, each consisting of an inner fixed part containing an opening or openings for the passage of bees through same, and an outer detachable part for preventing said passage, united to form a rectangular compartment with vertical walls for containing movable-frames. The hive-section is adapted for combination with one or more similar hive-sections, upon removal of the detachable parts and placing the corresponding fixed parts containing the openings in juxtaposition in such manner as to provide communicating passageways for the bees between the hive-sections, to form a compartment of one story, and is also adapted for combination with one or more similar hive-sections or combinations of similar hive-sections in more than one story by placing one over another, thereby providing for such alteration of size and shape of beehive as may be advisable for the best management of bees, the detachable parts being placed in position when required to form an outer wall of the beehive.

My invention includes improvements in construction of parts of the beehive which are also applicable to beehives comprising hive-sections like those shown and described in the above mentioned patent; the functions of the hive-sections being substantially the same in both inventions except in the matter of protection afforded in the present invention by the double walls on two sides.

The invention is illustrated by the accompanying drawings in which—

Figure 1 is an isometric drawing of a beehive comprising a bottom board; four hive-sections, two of which have one or more detachable parts removed and one hive-section shown moved to the left with both detachable parts removed, one of which detachable parts is shown moved farther to the left; an inside cover on one of the hive sections with half of a cover over same; an entrance block with fastener; and some of the internal parts of a beehive including a division board with fastener, a movable-frame with a detachable-reversible-spacing-hanger, an appliance for fastening the inside cover and ventilating the top of beehive, and detachable bottom plates for closing the air spaces in the double walls. Fig. 2 is a vertical section at 2—2, Fig. 1, showing in detail the connection of the bottom board with the double wall at rear of beehive. Fig. 3 is an isometric drawing showing the inside surface at one end of a detachable part, as at 3—3, Fig. 1. Fig. 4 is an enlarged isometric drawing at 4—4, Fig. 1, showing details of construction at one corner of a hive section, with the detachable part removed. Fig. 5 is an isometric drawing of the ends of two movable-frames showing in detail two detachable-reversible-spacing-hangers. Fig. 6 is an elevation and section at 6—6, Fig. 1, showing details, and method of operating a division board fastener. Fig. 7 is an isometric drawing at 7—7, Fig. 1, showing a section at entrance block and details of an entrance block and fastener.

In these drawings various principal parts are uniformly designated by capital or upper case letters, generally, like those designating parts having similar functions in my Patent No. 1,068,196, as follows: A—outer part of double wall of hive-section. B—bottom board. C—clamp for combining parts of beehives or hive-sections. D—division board. E—entrance block. F— movable brood-frame. G or G$^x$—detachable floor plate. H—honey-section case. K—inner part of double wall of hive-section. M—detachable part of hive-section. O—fixed part of hive-section in which open space for the passage of bees through same is provided. Q—queen excluder. S—section for comb honey. T—cover. U—inside cover. Details of these parts are uniformly designated by the corresponding lower case letters, with accent figures when necessary.

The rectangular movable-frame hive-section which is the basis of this beehive comprises two opposite double walls each consisting of an outer part A, and an inner part K, with an air space between same, which are held vertical and in proper position by attachment at ends to the parts O placed at right angles to the double walls and forming therewith a rectangular compartment, two opposite double sides of which are complete and two opposite sides contain open space for the passage of bees through same. This compartment may be combined with a like one in a single story by placing the corresponding fixed parts O in juxtaposition as shown in Fig. 1. If it is desired to make the side O, containing openings, a complete outside wall a detachable part M is secured in position outside of the fixed part O as indicated. It is evident that openings are required in only one side of the hive-section for the passage of bees unless more than two hive-sections are combined in a single story, which is generally undesirable. For convenience in manipulating it is however advisable to make the opposite sides alike. One, two or more hive-sections may be used in a single story and there may be any number of stories; the bottom boards and tops being of the proper length for the number of hive-sections desired in a single story. It is my intention to manufacture the hive-sections from any suitable materials and to adopt any details of construction which I find to be conducive to proper strength, durability, simplicity and economy; but in order to fully explain my invention I will proceed to describe the construction which now appears best for the hive-section and other parts of the beehive, the main features of the invention are however not limited to these details.

The fixed part O, consists of two horizontal metal bars $o^3$ and $o^4$, on one side of which, at each end, vertical bars $o^5$ and $o^6$ are welded or otherwise firmly connected in the right position to fit into grooves $a^7$ and $k^7$, deeply cut into the ends of parts A and K respectively, see Fig. 4. Horizontal grooves $a^8$, $k^8$ and $a^9$, $k^9$, cut to a less depth in the ends of A and K admit the horizontal bars $o^3$ and $o^4$ to be embedded flush with the end surfaces $a^{10}$ and $k^{10}$ of same. The vertical bars $o^5$ and $o^6$ are secured in place by means of nails, staples or similar devices, and the grooves over same filled flush with putty or other material suitable for the purpose. This construction with less vertical bars is applicable and has been used for hive-sections having single side walls such as described in my Patent No. 1,068,196, and is particularly well adapted to secure accurate dimensions, to prevent warping, and for shipment in the flat. The interior horizontal dimensions of the hive-section are equal and the top $o^1$, of bar $o^3$, is at the same elevation as the shelf $k^1$, both of which are adapted to support movable-frames, honey-section cases and division boards. The bar $o^4$ is placed a little above the base $k^2$ and rabbeted base $a^2$, which are adapted to be supported by, and to slide upon, the top edges $a^3$, $k^3$ or $m^3$ of another similar hive-section or the top edges $b^3$ of bottom board cleats, thereby providing a bee-space between said bar and the tops of honey-section cases, queen excluder, projecting parts of frames or division boards. The overhanging projections $a^4$ and $m^4$ and corresponding rabbeted shelves $a^5$, $m^5$ and $b^5$, about a bee-space under same, designed to make the beehive weatherproof, and hand holes $a^6$, of usual design, are essentially the same as in the hive-section described in my Patent No. 1,068,196. Upon removal of the detachable parts M, the hive-sections are adapted to slide into position in the same manner as described in that patent and clearly shown in Fig. 1, without crushing bees. The use of double walls, removes in great measure the objection which many beekeepers make to painting the outside walls of beehive. It also affords a means of confining the bees, when desirable, without the irritating effect which results from their confinement in a single small compartment. In Fig. 3 the position of the horizontal bars $o^3$ and $o^4$ of the fixed part O, and of the ends $a^{10}$ and $k^{10}$ of parts A and K of the double wall are shown by dotted lines. The cleat or corner piece $m^6$, prevents the detachable part M from warping and provides a return as shown, of the overhanging projection $m^4$ and rabbeted shelf $m^5$. The bars $o^3$ and $o^4$ are each about half a bee-space in thickness and the projecting pieces $m^7$ at each of M are of such thickness that a movable-frame may be placed in direct contact with the bars and be properly spaced with respect to the main portion $m^9$, of part M. When two hive-sections are placed in juxtaposition in one story the movable-frames in each can be placed in direct contact with these bars and correct spacing of frames will be secured. When honey-section cases are similarly placed a thin separator with openings is inserted between the fixed parts O. The staples or equivalent projections $m^8$, spaced properly to come in contact with the bars $o^3$ and $o^4$ with which they coöperate, are for the purpose of keeping the part M in its correct position with the aid of a clamp C.

The small bars $o^3$ and $o^4$ are unsuitable for use with wedges or springs acting at right angles thereto, such as are usually provided for forcing the frames or honey-section cases to one end of the compartment. The combined division board and fastener D shown in Figs. 1 and 6, is therefore provided. This consists of a division board $d$, of usual construction and not claimed as new, to which is attached by rivets or equivalent $d^1$, the spring $d^2$, having sharp ends $d^3$, said rivets extending through the slots $d^4$ near the ends of the spring; the two ends of division board and spring being alike. The spring $d^2$ is slightly longer than the distance between the inside faces $k^{11}$ of parts K, and consequently the sharp ends $d^3$ project into said parts when the spring is horizontal, as shown by line at $d^5$ thereby securing the division board in position. To loosen the division board the middle of spring is raised, thereby withdrawing the sharp ends. To insert the division board the spring is raised at middle and the division board pressed into its desired position and the spring released. This is much more convenient than are the ordinary appliances for the reason that the device for fastening is attached to the division board and is therefore always at hand when needed. The division board can be instantly locked or unlocked by this device at any point in the hive-section and it may be held firmly in position without exerting pressure against the frames if so desired, all qualities not possessed by the usual devices. My invention is not limited to a perfectly straight spring, to the means of attaching same to the division board or to the sharp ends shown, but I contemplate the use of usual shapes and connections and of ends adapted to react properly against the sides of beehive.

The bottom board B, Figs. 1, 2 and 7, is substantially the same as described in my Patent No. 1,068,196, except that it is of greater width and has an additional cleat $b^4$, which may or may not be continuous, for the support of each of the parts K. The bottom board may be of proper length for one or more hive-sections as required. The entrance block E, Figs. 1 and 7, is also substantially the same as described in the above mentioned patent except that the outer edge contains the groove $e^4$, for attaching the fastening, which is new. This fastening consists of a bent wire $e^5$, which passes through the block and has portions $e^6$ and $e^7$ extending upward on the outside and inside respectively, of the overhanging projections $a^4$ or $m^4$ of the hive-section. The end $e^8$ of this wire is so bent as to project into the groove $e^4$ a short distance, by which means it is secured in position as shown. By springing this projection or catch out of the groove and turning the wire so that the parts $e^6$ and $e^7$ are nearly horizontal the block is released and may be moved out laterally.

The inside cover U, Fig. 1, for confining the bees, is substantially the same as described in my Patent No. 1,068,196, and is supported by the top edges $k^3$ and $m^3$ only of hive-section. The cover T, of proper length for the number of hive-sections used, is of ordinary telescoping construction except that it has the eccentrically pivoted buttons $t^6$, and blocks $t^5$ which are attached to the cover and adapted to rest upon and hold the inside cover U in position. The screws or equivalent $t^7$, which hold these buttons in position are shown nearer the bottom than the top edge of button. Consequently when the buttons are reversed the bottom edges $t^4$ of cover T are raised above the rabbeted shelves $a^5$ and $m^5$, thereby permitting the circulation of air between the inside and outside covers without releasing or exposing the bees.

For closing the space between the parts A and K of double wall, if desired, the detachable floor plate G is provided. This consists of a slat having proper width and the same length at top as parts A and K and having its ends rabbeted so as to permit it to rest on the bars $o^3$ or $o^4$, and to extend below same sufficiently to be secured in position thereby, longitudinally. The upper part is of sufficient thickness to bring it about flush with the top edges $a^3$ and $k^3$ of hive-section, when resting on bar $o^3$. A slightly different form of detachable floor plate $G^x$ which does not necessarily extend above the bars $o^3$ and $o^4$ except at ends may be made of sheet metal if desired with the ends properly bent to rest on top of bars $o^3$ or $o^4$, and be properly secured.

The frames F, Figs. 1 and 5, consisting of top bars $f^{12}$, bottom bars $f^{13}$, and end bars $f^{14}$, are substantially the same as described in my Patent No. 1,068,196, and are of usual construction except in the matter of means of supporting same, which comprises the rivets, staples or equivalent supports $f^4$, $f^{4x}$, in the end bars of frames, and the detachable reversible spacing-hangers $f^5$, $f^{5x}$. The supports $f^4$, are preferably placed in the vertical axes of frames and equal distances from the horizontal axes. The weight of the frame is transmitted through the upper support $f^4$, to the hanger by means of the abrupt bend in same $f^6$, immediately under the support $f^4$, and thence through the upper parts of hanger $f^7$ and $f^8$ to the rabbeted supporting shelf $k^1$, or the top of bar $o^1$. The hanger between the supports $f^4$ is formed to provide at sides of frame end-bar horizontal parts $f^{11}$ parallel to frame top-bar and vertical parts $f^{10}$ opposite thereto. The forms shown, to which the invention is not limited, are each made of a single piece of wire bent to provide the said horizontal and vertical parts as shown. The bottom support serves to help hold the entire hanger in its proper position relative to the frame; the hanger being sprung slightly in the act of attaching it by means of the bend $f^9$ and bottom support $f^4$. The action of each support in the matter of spacing is very direct. The hanger is so shaped that the vertical parts $f^{10}$ engage the horizontal parts $f^{11}$ of adjacent hangers at single points, thereby reducing the opportunity for the bees to fasten them with propolis to a minimum. The form of hanger shown on the left frame differs from that on the right in being adapted for use with the loop supports $f^{4x}$ through which the loops $f^{8x}$ and $f^{9x}$ of hanger pass, in the upper horizontal projection $f^{11}$ which is practically independent of the lower projections, in the part which connects the upper and lower pairs of projections which is a vertical connecting the vertical projections instead of a diagonal between the upper horizontal and lower vertical projections, and in the parts $f^{7x}$ and $f^{8x}$ the first of which is inclined upward and away from the end of frame so that $f^{8x}$ is not in contact with the end of frame except that if the hanger is made of a fair quality of spring steel the construction permits of the part $f^{8x}$ being forced toward the end of frame, thereby permitting a frame to be lifted vertically from a lower hive-section without disturbing the hive-section over same. The hanger can be very readily attached and detached without the use of tools when the frame is held in the hands and also, the form shown on right by means of a simple clamping device when it is in the hive-section. It is therefore well adapted for reversing the frames and for permitting the removal of frames from a lower hive-section or their insertion. It is of special value for extracting, as the accurate spacing of frames will tend toward the production of very uniform combs in the frames, which after removal of hangers are without any parts projecting beyond the faces of combs, and therefore in the best possible condition for uncapping. It is my intention to have the tops of frames flush with the supporting shelves $h^1$, for the reasons given in my Patent No. 1,068,196, but this hanger is adapted for supporting them at any height desired.

The hive-sections and accessories are well adapted to form tenement beehives of any length, for wintering or other purposes.

Referring to the beehive shown in Fig. 1, as a whole, it will be observed that while it is very desirable as a sectional beehive comprising hive-sections adapted for rearrangement to suit changes in requirements, it is also desirable as a complete double walled beehive for use at all seasons of the year and for all purposes. The brood-frames may be placed in the lower story during the summer, and in the middle of two stories in winter. Under these conditions the double walls can be packed with chaff or other material without difficulty by the aid of the detachable floor plates and inside cover, and the ends of beehive warmly packed in winter. Or the bees may be allowed access to the space between the parts of double wall in summer as a means of swarm control; there being sufficient space for the insertion of an additional brood-frame or honey-section case, for which these spaces are adapted. The bees may be given access to these spaces from the bottom board by the omission of portions of cleat $b^4$, Fig. 1, and Fig. 2, and detachable floor plates G, Fig. 1, or holes for the purpose may be made through the parts K. At the same time the beehive is suited to the needs of a swarm of any size and is readily divided.

Having described my invention what I claim is:

1. A hive-section comprising two opposite double walls each containing an air space between the component parts thereof, said walls being united at their ends to fixed parts, at right angles thereto, to form a rectangular compartment with vertical walls for containing movable-frames said fixed parts having an opening or openings whereby the hive-section is adapted for combination with one or more similar hive-sections in one story by having the corresponding fixed parts containing openings placed in juxtaposition in such manner as to provide communicating passageways for the bees from one hive-section to another through same, and also adapted for combination with one or more similar hive-sections or combinations of similar hive-sections in more than one story by placing one over another, and detachable sides for the hive-section adapted for connection to form closed walls outside of the fixed parts containing openings.

2. A beehive consisting of a bottom board, a cover and one or more hive-sections each comprising two opposite double walls containing an air space between the component parts thereof, united at their ends to fixed parts, at right angles thereto, to form a rectangular compartment with vertical walls for containing movable-frames said fixed parts having an opening or openings whereby the hive-section is adapted for combination with one or more similar hive-sections in one story by having the corresponding fixed parts containing openings placed in juxtaposition in such manner as to provide communicating passageways for the bees from one hive-section to another through same, and also adapted for combination with one or more similar hive-sections or combinations of similar hive-sections in more than one story by placing one over another, and detachable sides for the hive sections adapted for connection to form closed walls outside of the fixed parts containing openings, all substantially as set forth.

3. In a hive-section the combination with two opposite walls of fixed parts containing an opening or openings and adapted to be secured at right angles to said walls, each comprising two horizontal bars on one side of which suitably spaced vertical bars are rigidly attached, said walls being provided with horizontal and vertical grooves in their ends fitted to receive the horizontal and vertical bars respectively, and means for securing same in position, all substantially as set forth.

4. The combination with two frames each composed of rigidly attached horizontal and vertical bars, of opposite walls containing horizontal and vertical grooves in the ends thereof corresponding to the horizontal and vertical bars, and means of attachment, to form a rectangular compartment with vertical sides or walls.

5. In a hive-section the combination with two opposite double walls each containing an air space between the component parts thereof a member comprising rigidly connected horizontal and vertical bars inserted and secured in horizontal and vertical grooves at each end of the double walls to unite the same to form a rectangular compartment with vertical double walls for containing movable frames, the said horizontal bars extending between the parts of the double walls to unite same, of detachable floor plates of proper length and width to close the space between the component parts of the double walls, adapted to rest upon the same horizontal bars and containing downwardly projecting portions adapted to prevent motion longitudinally, all substantially as set forth.

6. In a hive-section the combination with two opposite walls united at their ends to fixed parts at right angles thereto, to form a rectangular compartment with vertical walls for containing movable frames, of a division board with a spring having sharp ends, and of slightly greater length than the distance between the said walls and having slots therein near its ends, and fastening means passing through said slots to secure the spring to the division board, said spring being adapted to secure the division board in any desired position in the hive-section, by allowing the spring to lie straight with the sharp ends projecting into the walls, and adapted to release the division board by raising the middle part of spring, thereby shortening the horizontal distance between the sharp ends of same, all substantially as set forth.

7. In a beehive the combination with the opposite walls of a rectangular compartment for containing movable frames of a division board with a spring of slightly greater length than the distance between said opposite walls having ends adapted for reaction against same and fastening means allowing slight longitudinal motion near the ends of spring to secure same to the division board, said spring being adapted to secure the division board in any desired position in the compartment by allowing the spring to straighten so the ends of same react against the walls, and adapted to release the division board by raising the middle part of spring, thereby shortening the distance between the ends of same.

8. The combination of a hive-section comprising two opposite walls, fixed parts containing an opening or openings united to the ends of said walls to form a rectangular compartment with vertical walls for containing movable frames, said walls being formed at their top edges with rabbeted shelves, of movable brood-frames consisting of a top-bar, a bottom bar and end bars, a pair of spaced supports on each of the end bars, and reversible spacing-hangers each adapted to be readily attached to and detached from a pair of said supports the upper one of which supports the frame while it is steadied by the lower one, said hangers having vertical projections to engage horizontal projections on the adjacent hangers and corresponding horizontal projections to engage vertical projections on the adjacent hangers, thereby fixing the distance between frames, and a horizontal projection at top adapted to rest upon the rabbeted shelf of the hive-section wall, all substantially as set forth.

9. A reversible-spacing-hanger for beehive brood-frames having horizontal and vertical projections adapted to engage vertical and horizontal projections, respectively, of an adjacent hanger, with means of detachable engagement with securing means on the end bars of movable-frames, and a projection adapted to rest upon a support for the movable-frames.

10. In a beehive consisting of a bottom board, a cover and one or more hive-sections, each comprising two opposite walls united at their ends to fixed parts, containing an opening or openings, to form a rectangular compartment with vertical walls for containing movable frames, said walls being formed at their upper edges with outside rabbeted shelves, of an inside cover consisting of a thin board with a rim adapted to rest upon the top edges of the hive-section, said cover having blocks attached thereto and buttons eccentrically pivoted to the blocks and adapted to support the inside cover, whereby the edges of the cover may be made to rest directly upon the outside rabbeted shelves near top of hive-section or be raised above same so as to permit ventilation over the top of inside cover, all substantially as set forth.

11. In a beehive, the combination of a bottom board cleated at ends and back, a hive-section, each side of which has a rabbeted base forming an overhanging projection at the outer side, said section adapted to be so supported by the cleats on the bottom board as to leave an entrance space between the front edge of bottom board and said overhanging projection, a sliding entrance block of rectangular cross section, with front edge grooved and of proper size to close the space between the overhanging projection and front edge of bottom board, and a bent wire passing through the block and having projections adapted to engage the sides of the overhanging projection at bottom of hive-section and thereby prevent lateral movement of the entrance block, with a projection adapted for insertion in the groove to secure it in position, and adapted for movement to disengage the first mentioned projections thereby releasing the entrance block, all substantially as set forth.

12. A beehive comprising double-walled hive-sections each having overhanging projections $a^4$ and $m^4$ extending below the base edges $k^2$ of the inner walls, and rabbeted base edges $a^2$ and $m^2$ of the outer walls, and having rabbeted shelves $a^5$ and $m^5$ outside of and below the uppermost edges $a^3$, $k^3$ and $m^3$ upon which latter a superimposed hive-section is adapted to rest, and the two opposite sides of each hive-section being constructed with outer detachable portions M which include the said edges $m^3$, whereby the removal of said detachable portions adapts one hive-section to slide upon another, horizontally into position, the only contact being between the base edges $k^2$ and rabbeted base edges $a^2$ and top edges $a^3$ and $k^3$, and whereby the replacing of the detachable sides M secures weather-proof joints on all sides with a bee-space between the overhanging projections $a^4$, $m^4$ and rabbeted shelves $a^5$, $m^5$ under same, all substantially as set forth.

GEORGE P. WOOD.

Witnesses:
 LESLIE G. HOLLERAN,
 WARREN F. RUGG.